ବ3,096,367
Patented July 2, 1963

3,096,367
**PREPARATION OF A MIXTURE OF 1 PART 2,3,6-
AND 3 PARTS 2,3,5-TRICHLOROBENZOIC ACIDS**
Jack S. Newcomer, Wilson, Jerome Linder, Niagara Falls, and Keith J. Smith, Lockport, N.Y., assignors to Hooker Chemical Corporation, a corporation of New York
No Drawing. Filed Mar. 31, 1958, Ser. No. 724,852
2 Claims. (Cl. 260—515)

This invention relates to the regulation of plant growth and to synthetic compositions which produce growth changes in living plants.

The present invention resides in the concept of a synergistic weed-killing and regulating composition comprising a mixture of 2,3,6- and 2,3,5-trichlorobenzoic acid. The embodiment of this concept has unique properties as a plant growth regulant not logically predictable from the established regulating properties of the constituent ingredients.

It would be expected from observing the prior art, that the mixture of an active plant regulatory compound with a relatively inactive regulatory compound would result in a composition having activity lower than its active ingredient. This is expected since the inactive compound competes with the active compound for the active centers of the enzymatic site of plant regulatory activity. See for example, Andus "Plant Growth Substances," Interscience Publishers Inc., N.Y. (1953) p. 72. Correspondingly, this observation would be true with an active isomer and an inactive isomer of a composition of matter.

It was, therefore, unexpected and surprising to discover that a mixture of the relatively less active 2,3,5-trichlorobenzoic acid with the more active 2,3,6-trichlorobenzoic acid, is significantly more active than would be expected from additivity of the activities of the 2,3,6- and 2,3,5-trichlorobenzoic acid components.

The advantages of this synergistic mixture are many; some of the more important ones are its ease of manufacture and its desirable physical properties. Certainly a desirable property of this synergistic mixture is that the freezing point of the emulsifiable oil or amine salt formulations is lower than that of equally concentrated formulations of the pure isomer. This mixture can be much more economically manufactured than either of the pure components since the difficult and tedious isomer separations are avoided.

Synergistic mixtures of 2,3,5- and 2,3,6-trichlorobenzoic acids can be economically manufactured by chlorination of benzoyl chloride to a level of chlorination between di- and tetrachlorobenzoyl chloride (specific gravity of 1.500–1.685 (twenty-five degrees centigrade) of the crude trichlorobenzoyl chloride) as detailed in Example 1 below, followed by distillation to isolate the trichlorobenzoyl chloride fraction, followed by hydrolysis to the trichlorobenzoic acids. Such a method of manufacture gives a product having a 2,3,5- to 2,3,6-trichlorobenzoic acid ratio of approximately three to one. However, other isomer ratios can be obtained by further fractional distillation or crystallization of the trichlorobenzoyl chlorides or trichlorobenzoic acids respectively. Any desired mixture of 2,3,6- to 2,3,5-trichlorobenzoic acid containing substantial amounts of both isomers can be employed without deviating from the spirit of this invention; however, it is preferred for economic reasons to use the mixtures which arise from the process of benzoyl chloride chlorination followed by fractionation as outlined above.

These mixtures can be employed as the solid acids, alone or admixed with a solid carrier, or they can be formulated as emulsifiable oil concentrates by solution in a mixture of an emulsifier and an organic solvent. Also, the acid mixture can be formulated as an aqueous solution of water-soluble salts. It is preferred, for economic reasons, to employ an aqueous solution of the dimethylammonium salts, although other amine salts or alkali metal salts may be employed similarly.

EXAMPLE 1

*Manufacture of 2,3,5- and 2,3,6-Trichlorobenzoic Acid in Admixture*

Benzoyl chloride containing 0.2 percent ferric chloride as a catalyst was chlorinated at one hundred and twenty to one hundred and fifty degrees centigrade until a specific gravity of 1.525 (twenty-five degrees centigrade) was reached. The crude mixture of di- and trichlorobenzoyl chlorides was fractionated on a column of twenty theoretical plates at 6–8 mm., taking off foreshot material until the instantaneous value of the specific gravity of the distillate reaches 1.567 (twenty-five degrees centigrade), using a nine to one reflux ratio.

The remainder of the acid chloride in the stillpot was stirred with excess water at the reflux temperature for twenty-two hours, yielding trichlorobenzoic acid in nearly quantitative yield based on the trichlorobenzoyl chloride. The neutralization equivalent of the amorphous solid product was two hundred and twenty-five (theory 225.5). The infrared spectrum showed the mixture to be principally 2,3,6- and 2,3,5-trichlorobenzoic acid in three to one ratio. Only minor amounts of other trichlorobenzoic acid isomers were detectible (in amounts less than ten percent).

EXAMPLE 2

*Formulation as Emulsifiable Oil*

The product of Example 1 was dissolved in a three to one mixture of xylene and Atlox G8916P (which is a non-ionic emulsifier derived from sorbitol) emulsifier to make a solution containing 0.12 g./ml. This was an oil emulsifiable with water.

EXAMPLE 3

*Formulation as Dimethylammonium Salt*

To a stirred and cooled (twenty-five to forty degrees centigrade) mixture of the product of Example 1 with one-half part by weight of water is added a forty percent aqueous dimethylamine solution until a pH of 7.5–8.0 is reached. Water is then added to bring the solution to a density of 9.40 lbs./gallon (four lbs./gallon of trichlorobenzoic acid equivalent). The resultant formulation is an amber solution miscible with water in all proportions.

EXAMPLE 4

*General Broad-Leaf Weed Control*

A plowed and disked area infested with a variety of broad-leaf annual weeds (principally pigweed, mustard, lambs' quarters, and ragweed) was divided into plots which were sprayed pre-emergence with 2,3,6-, 2,3,5- and mixed 2,3,6-/2,3,5 (three to one ratio by weight)-trichlorobenzoic acids at 1 lb./acre of each compound or mixture, using formulations of the type of Example 2. The plots were then inspected approximately two months later.

| Compound | Percent Weed Control [1] | Height Suppression of Remainder |
|---|---|---|
| 2,3,6-trichlorobenzoic acid | 84 | 94. |
| 2,3,5-trichlorobenzoic acid | less than 66 | less than 40%. |
| 2,3,5/2,3,6-(3:1) mixture | 91 | 88. |

[1] $100 - \left(\frac{\text{weeds/sq. ft. in test plot}}{\text{weeds/sq. ft. in control}}\right) \times 100$.

The calculated percent weed control for the mixture on the basis of additivity, using a weighted average of percent weed control obtained using the individual isomers, would obviously be less than the percent weed control obtained with pure 2,3,6-isomer.

EXAMPLE 5

Chlorinated benzoic acids as specified below were applied to plots at four lbs./acre in an old quackgrass sod when the quackgrass was about eight inches in height. The treated areas were plowed one week after the application. Counts of the number of quackgrass shoots per square foot were made after approximately one month.

| Compound: | Percent control [1] |
|---|---|
| 2,3,6-trichlorobenzoic acid | 74-92 |
| 2,3,5-trichlorobenzoic acid | 57 |
| 2,3,5-/2,3,6-trichlorobenzoic acid combination (3:1 ratio) | 90 |

[1] $100 - \frac{\text{shoots/sq. ft. in test plot}}{\text{shoots/sq. ft. in control}} \times 100$

EXAMPLE 6

To accurately define the relative plant growth regulatory activity of the 2,3,5- and 2,3,6-trichlorobenzoic acids and mixtures thereof, bio-assays for root inhibitory action were carried out under controlled laboratory conditions. The technique used was essentially that of Thompson et al. (Botanical Gazette 107, 476–507 (1946)). Cucumbers were chosen as the best organism because of their convenient rate of germination and root growth as well as their remarkable freedom from fungal attack under Petri dish germination conditions. This procedure constitutes one of the most satisfactory laboratory methods known for indicating the response of dicotyledous species to a root-inhibiting chemical, and avoids the complicated interaction of the chemical with the soil as is involved in field or greenhouse evaluation procedures.

Using the techniques of Thompson et al. rapidly-growing cucumber roots were exposed to the test chemicals in solutions at pH 6–7, at twenty-four to five degrees centigrade in the presence of light for six days, and the concentrations of chemical (given in parts per million) required to give fifty percent inhibition of root elongation ($IC_{50}$ thereby determined. The results are presented in the following table, and clearly indicate a synergistic interaction between the 2,3,5- and 2,3,6-isomers.

| Chemical [1] | Observed $IC_{50}$ (total parts per million of Trichlorobenzoic Acid) | Calculated $IC_{50}$ assuming no synergism [2] |
|---|---|---|
| 2,3,5-Trichlorobenzoic acid | 20-21 | |
| 2,3,6-Trichlorobenzoic Acid | 8-9 | |
| 1:1 mixture 2,3,5-/2,3,6-Trichlorobenzoic Acid | 8-9 | 14-15 |
| 6:1 mixture 2,3,5-/2,3,6-Trichlorobenzoic Acid | 14-15 | 18-19 |
| 1:3 mixture 2,3,5-/2,3,6-Trichlorobenzoic Acid | 6-7 | 11-12 |

[1] In the form prevalent at pH 6–7.

[2] $IC_{50} \text{ (mixture)} = \left(\frac{\text{Percent 2,3,5-}}{100}\right) \times IC_{50}(2,3,5) + \left(\frac{\text{Percent 2,3,6-}}{100}\right) \times IC_{50}(2,3,6).$ This application is a continuation-in-part of copending application S.N. 661,600, filed May 27, 1957, now on file in the United States Patent Office.

Combinations of the composition of this invention with other known herbicides or compositions for controlling the growth of vegetation and plants to obtain desirable combinations and properties are within the spirit of this invention. A mixture for example, of the composition of this invention with di and tetra chlorobenzoic acids has given desirable results. It is preferred, however, that for best results in these di and tetra combinations that said combinations contain about from sixty to ninety percent of trichlorobenzoic acid.

The examples of the compositions of our invention, and methods of preparing and utilizing them, which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:

1. A process for the preparation of a synergistic herbicidal mixture containing 3 parts of 2,3,5-trichlorobenzoic acid per part of 2,3,6-trichlorobenzoic acid which comprises adding chlorine to benzoyl chloride in the presence of ferric chloride at a temperature of about one hundred and twenty to about one hundred and fifty degrees centigrade until the resultant chlorinated reaction mixture reaches a specific gravity of about 1.500 to 1.685 when measured at twenty-five degrees centigrade, separating the trichlorobenzoyl chloride fraction from the said chlorinated reaction mixture, and heating the fraction thus isolated with water.

2. A process for the preparation of a synergistic herbicidal mixture containing 3 parts of 2,3,5-tricholrobenzoic acid per part of 2,3,6-trichlorobenzoic acid which comprises adding chlorine to benzoylchloride in the presence of ferric chloride at a temperature of about one hundred and twenty to about one hundred and fifty degrees centigrade until the resultant chlorinated reaction mixture reaches a specific gravity of about 1.500 to 1.685 when measured at twenty-five degrees centigrade, fractionally distilling the thus formed reaction mixture until the specific gravity of the distillate reaches about 1.567 when measured at twenty-five degrees centigrade, and heating the residual undistilled acid chloride mixture with water.

References Cited in the file of this patent

UNITED STATES PATENTS

| 2,394,916 | Jones | Feb. 12, 1946 |
| 2,726,947 | Baumgartner | Dec. 13, 1955 |
| 2,847,462 | Sieger | Aug. 12, 1958 |
| 2,848,470 | Girard et al. | Aug. 19, 1958 |
| 2,890,243 | Brown | June 9, 1959 |

OTHER REFERENCES

Fieser et al.: "Introduction to Organic Chemistry," 1957, pp. 142–144 inclusive (p. 144 especially of interest).

Hope et al.: Chemical Society Journal 123, 2470–2480 (1923).